March 10, 1964

L. J. O'BRIEN ETAL 3,124,377

SELECTIVE LOCKOUT HUB

Filed Nov. 5, 1959

INVENTOR.
LOREN J. O'BRIEN
BY EVERSON M. DeCOURSEY
LEONARD W. HARRY, JR.

Walter E. Pavlich

ATTORNEY

March 10, 1964  L. J. O'BRIEN ETAL  3,124,377
SELECTIVE LOCKOUT HUB

Filed Nov. 5, 1959  2 Sheets-Sheet 2

INVENTOR.
LOREN J. O'BRIEN
BY EVERSON M. DeCOURSEY
LEONARD W. HARRY, JR.

ATTORNEY

United States Patent Office 3,124,377
Patented Mar. 10, 1964

3,124,377
SELECTIVE LOCKOUT HUB
Loren J. O'Brien, Grabill, Everson M. De Coursey, Auburn, and Leonard W. Harry, Jr., Fort Wayne, Ind., assignors to Dana Corporation, Toledo, Ohio, a corporation of Virginia
Filed Nov. 5, 1959, Ser. No. 851,119
2 Claims. (Cl. 287—53)

This invention relates to a hub member for use on the wheels of a four wheel drive vehicle and more particularly to the provision of a hub member clutch which will allow the front wheels of a four wheel drive vehicle to be quickly and easily disconnected from their driving axle when the full four wheel drive is not required or desired.

Four wheel drive vehicles are designed for use upon exceedingly steep or difficult roads and under excessive load conditions where the traction furnished by the conventional two wheel drive would be insufficient. Under ordinary travel conditions where the four wheel drive is unnecessary, the four wheel drive and its associated mechanism interferes with fast, economical and facile driving. It is, therefore, highly desirable to provide means for disconnecting the front wheels of a vehicle from the driving mechanism so they may function simply for conventional steering purposes under ordinary road conditions, thus avoiding the power consuming interference and drag of the four wheel drive mechanism when the latter is neither required or desired.

An object of this invention lies in the provision of a selectively operable clutch mechanism for alternately interconnecting and disconnecting a wheel of a vehicle to a driven axle thereof.

Another object of this invention is to provide an actuator which requires only a 90° rotation to effect connection or disconnection of the clutch mechanism.

Still another object of this invention is to dispose the actuator externally of the clutch casing so as to be easily accessible for operation.

A still further object of this invention is to facilitate the engaging movement of the clutch mechanism by providing resilient means for urging the clutch members together so that when the clutch members do not mate by reason of their being circumferentially offset with relation to each other, the resilient means will cause engagement of the clutch members upon relative movement therebetween.

A still further object of this invention is to accomplish the above stated objects by a structure which is easily and inexpensively manufactured.

These and other objects and advantages will become apparent from the following detailed description taken in connection with the accompanying drawings, which constitutes one preferred embodiment of this invention, wherein.

Figure 1:
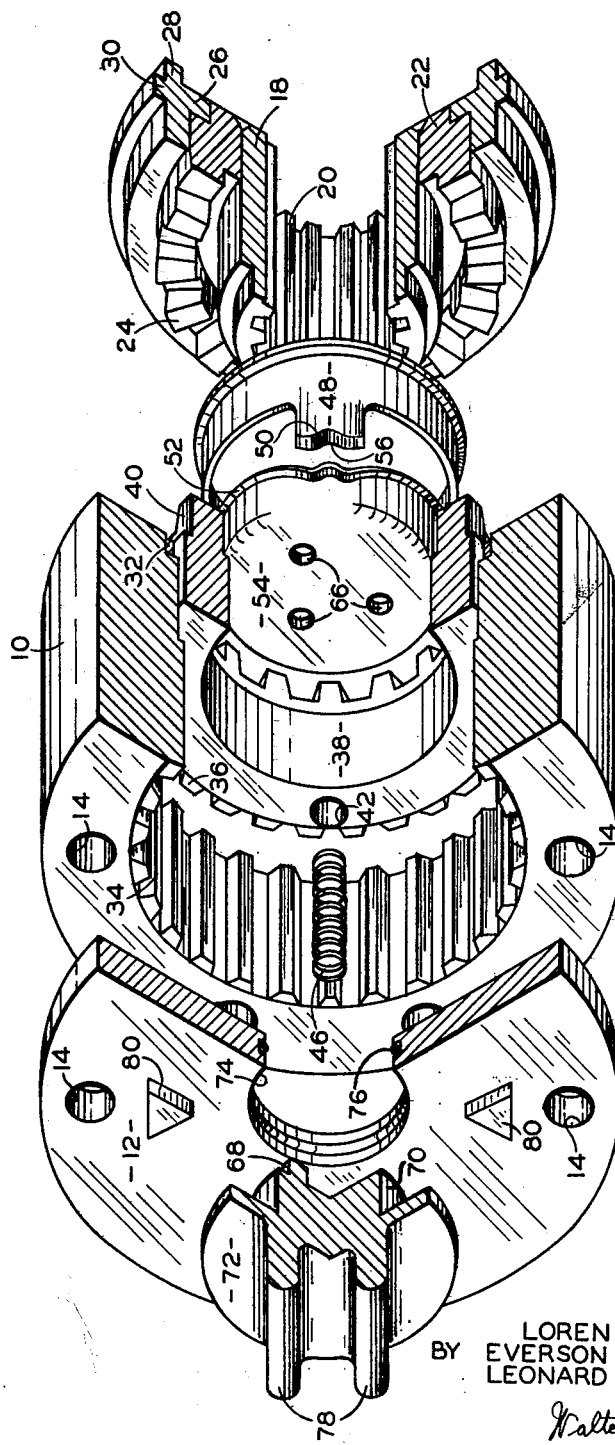
FIG. 1 is an exploded view of the selective lockout hub embodying this invention with a portion cut away to reveal the internal structure.
Figure 2:
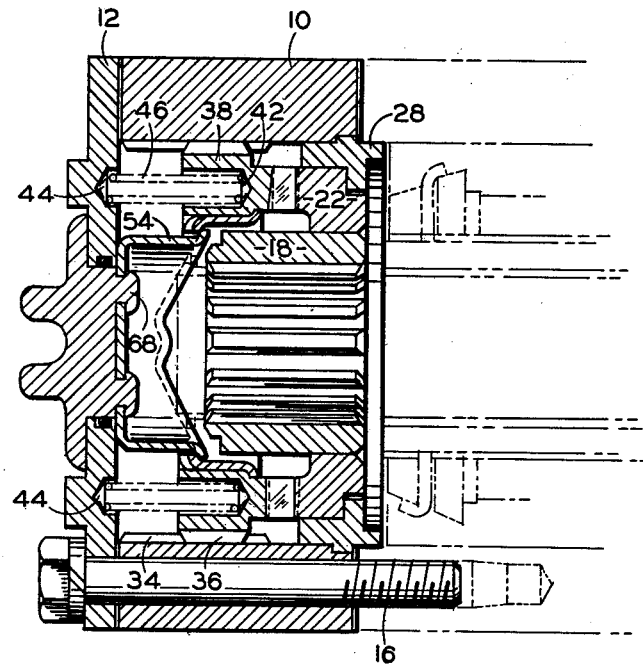
FIG. 2 is a longitudinal sectional view of the lockout hub illustrated in FIG. 1.

Referring now more particularly to the drawings, a cylindrical lockout hub housing 10 is provided with a circular cover 12 abutting against and enclosing the outer end thereof. The hub member 10 and the cover plate 12 have diametrically opposed matching holes 14 which receive bolts 16, only one shown (FIG. 2). The bolts 16 extend completely through the cover plate 12 and the hub 10 and are received in a wheel hub, shown in phantom lines in FIG. 2, to firmly secure the hub member and cover plate thereto. The wheel hub is also of cylindrical configuration and a power shaft or axle (not shown) is adapted to extend therethrough and into an axle sleeve 18 positioned within the lockout hub 10. The axle sleeve 18 is internally splined at 20 to receive external splines on the power shaft and is thereby fixed for rotation with the axle.

The axle sleeve 18 is provided with an inner clutch ring 22 concentric therewith and welded to the inner end thereof. The inner clutch ring 22 has face coupling teeth 24 spaced from the axle sleeve 18 and extending in a direction parallel to the axis of the axle sleeve 18 and the clutch ring 22. An annular shoulder is also provided on the inner clutch ring 22 and slidably receives a matching rib 26 extending inwardly from the body portion of a suitable bearing or bushing 28. The bushing 28 has an outwardly extending annular rib 30 which is received on an annular shoulder 32 provided on the inner end of a lockout hub housing 10 and is firmly compressed between the hub housing 10 and the wheel hub. The hub housing 10 has internal splines 34 extending the length thereof and mating with external splines 36 disposed on an outer clutch ring 38. The outer clutch ring 38 is provided with face coupling teeth 40 disposed on the inner end thereof and is axially slidable within the hub housing 10 for causing engagement of the coupling teeth 40 with the coupling teeth 24 of the inner clutch ring 22.

Means is provided for normally holding the outer clutch ring 38 and the inner clutch ring 22 in engaged position. More particularly, the outer clutch ring 38 is provided with diametrically opposed seating recesses 42 and the cover plate 12 is provided with corresponding axially aligned seating recesses 44. A pair of coil springs 46 is mounted in compression with their opposite ends positioned within seating recesses 42 and 44 respectively to bias the outer clutch ring 38 in an inward direction.

Figure 3:
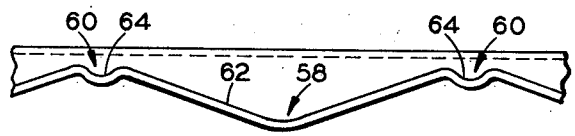
FIG. 3 is a detail view of the cam member illustrated in the previous views showing the contour thereof.

Means is provided for moving the outer clutch ring 38 axially against the bias of coil springs 46 to effect disengagement with inner clutch ring 22. To this end, a sleeve 48 is fitted within the outer clutch ring 38 and is provided with an outwardly extending annular flange which abuts against an internal shoulder of clutch ring 38. Diametrically opposed tongues 50 extend outwardly from the sleeve 48 in a direction parallel to the longitudinal axis of the sleeve. The outermost end of tongues 50 are bent inwardly at a right angle toward the axis of the sleeve 48 and are adapted to cooperate with a brim portion 52 of a substantially hat-shaped cam member 54. The under surface of each bent-over portion of the tongues 50 is provided with a convex projection 56 which rides atop the brim 52 of member 54. The brim 52 has a contour (FIG. 3) defining diametrically opposed low points 58 (only one shown in FIG. 3) and diametrically opposed high points 60 positioned at an angle of 90° to the low points. The high points 60 and the low points 58 are connected by a gentle sloping surface 62. The upper surface of the brim 52 is provided with detents 64 at the high points 60 to index the convex projections 56 therein.

The crown of the hat-shaped member 54 is provided with three apertures 66 which receive inwardly extending rivet portions 68 formed on a stem portion 70 of a cam actuator member 72. The stem 70 extends through an opening 74 disposed centrally on the cover plate 12 and terminates in a substantially circular body portion positioned externally of the cover plate. A suitable bearing member 76 is disposed in a recess formed about opening 74 and engages the stem 70 to facilitate rotation of the actuator. A pair of parallel outwardly extending ribs 78 are provided on the circular body portion of the actuator member 72 to facilitate manual operation of the actuator and also to indicate the relative position thereof with respect to triangular indicators 80 positioned on the cover plate 12.

In operation, with the parts in the position shown in FIG. 2, the drive is from the power shaft or axle (not shown) to the axle sleeve 18 and inner clutch member 22. Since the cam actuator 72 has been rotated to align low points 58 of the cam member 54 with the tongue followers 50, the outer clutch ring 38 is biased by coil springs 46 to hold the coupling teeth 40 thereof in engagement with coupling teeth 24 of the inner clutch member 22. Thus, the drive is from the inner clutch ring 22 to outer clutch ring 38, hub housing 10 which is splined thereto, and subsequently to the wheel housing.

Should it be desired to disconnect the wheel from the driving mechanism, the cam actuator 72 is merely rotated 90° either clockwise or counterclockwise. This effects corresponding rotation of cam member 54 and causes tongue followers 50 to ride up the incline surfaces 62 and become indexed in the detents 64 at the high points 60. The tongue followers 50 are maintained index in the detents 64 by the bias of the coil springs 46. Consequently, the outer clutch ring 38 is moved axially against the bias of coil springs 46 to effect disengagement of the coupling teeth 40 thereof with coupling teeth 24 of the inner clutch ring 22.

Upon rotation of the cam actuator 72 in either direction through another 90°, the low points 58 will again be aligned with the tongue followers 50 and the coil springs 46 will bias the outer clutch ring to effect reengagement of the coupling teeth 40 and 24. Should the coupling teeth 40 and 24 not mate by reason of their being circumferentially off-set with relation to each other, the coil springs 46 continues to bias the outer clutch ring 38 so that upon relative movement between the wheel and the axle the coupling teeth will be snapped into engaged position.

While only a single embodiment of this invention has been shown and described, it is apparent that there may be many changes in structure as well as operation without departing from the scope of this invention as defined by the appended claims.

What is claimed is:

1. In a clutch for effecting a driving connection between a power shaft and a wheel hub the combination comprising,
   (a) an inner clutch member adapted to be drivingly associated with a power shaft,
   (b) a housing having a closed end and an open end and being adapted for connection to the wheel hub,
   (c) an outer clutch member positioned in said housing in axially movable relationship and drivingly connected thereto,
   (d) said inner and outer clutch members having cooperating coupling means thereon adapted for driving engagement,
   (e) said outer clutch member being axially movable into and out of driven engagement with said inner clutch member,
   (f) resilient means disposed in said housing and compressed between said outer clutch member and said housing for normally urging said outer clutch member into engagement with said inner clutch member,
   (g) cam means operable to effect axial movement of said outer clutch member and including a circumferentially extending cam surface element and a cam follower element in cooperating engagement therewith, said cam surface element having circumferentially displaced alternately disposed high spots and low spots,
   (h) and carrying means mounted in said housing and being rotatable in either direction and disposed radially inwardly of said resilient means,
   (i) one of said cam elements being carried by said carrying means and the other of said cam elements being carried by said outer clutch member whereby upon rotation of said carrying means in either direction said cam follower element will engage alternately the high and low spots of said cam surface element effecting axial movement of said outer clutch member against the bias of said spring means.

2. In a clutch for effecting a driving connection between a power shaft and a wheel hub the combination comprising,
   (a) an inner clutch member adapted to be drivingly associated with a power shaft,
   (b) a hub member adapted for connection to the wheel hub,
   (c) an outer clutch member positioned in said hub in axially movable relationship and drivingly connected thereto,
   (d) said inner and outer clutch members having cooperating coupling means thereon adapted for driving engagement,
   (e) said outer clutch member being axially movable into and out of driven engagement with said inner clutch member,
   (f) a cover plate closing the outer end of said hub member,
   (g) spring means disposed in said hub and compressed between said outer clutch member and said cover plate for normally urging said outer clutch member into engagement with said inner clutch member,
   (h) cam means operable to effect axial movement of said outer clutch member and including a circumferentially extending cam surface element and a cam follower element in cooperating engagement therewith, said cam surface element having circumferentially displaced alternately disposed high spots and low spots,
   (i) and carrying means mounted in said housing and being rotatable in either direction and disposed radially inwardly of said resilient means,
   (j) one of said cam elements being carried by said carrying means and the other of said cam elements being carried by said outer clutch member whereby upon rotation of said carrying means in either direction said cam follower element will engage alternately the high and low spots of said cam surface element effecting axial movement of said outer clutch member against the bias of said spring means,
   (k) detent means disposed in some of said spots and adapted to engage said cam follower whereby the bias of said spring means urges said detent means and cam follower into engagement to resist relative movement therebetween.

References Cited in the file of this patent
UNITED STATES PATENTS

| | | |
|---|---|---|
| 1,793,221 | Iverson | Feb. 17, 1931 |
| 2,563,186 | Oehler et al. | Aug. 7, 1951 |
| 2,788,103 | Requa | Apr. 9, 1957 |
| 2,874,814 | Beck | Feb. 24, 1959 |
| 2,907,432 | Strickland et al. | Oct. 6, 1959 |